United States Patent
Koshima et al.

(10) Patent No.: US 10,280,267 B2
(45) Date of Patent: May 7, 2019

(54) POLYALLYLAMINE DERIVATIVE

(71) Applicant: AJINOMOTO CO., INC., Tokyo (JP)

(72) Inventors: Yuji Koshima, Kawasaki (JP); Naoya Sato, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 15/592,592

(22) Filed: May 11, 2017

(65) Prior Publication Data

US 2017/0327651 A1 Nov. 16, 2017

(30) Foreign Application Priority Data

May 13, 2016 (JP) .................. 2016-097275

(51) Int. Cl.
| | | |
|---|---|---|
| *C08G 81/00* | (2006.01) | |
| *C08G 81/02* | (2006.01) | |
| *C09D 11/00* | (2014.01) | |
| *G03G 9/13* | (2006.01) | |
| *C09D 11/106* | (2014.01) | |
| *C09D 7/46* | (2018.01) | |
| *C09D 7/65* | (2018.01) | |

(52) U.S. Cl.
CPC ............ *C08G 81/027* (2013.01); *C09D 7/46* (2018.01); *C09D 7/65* (2018.01); *C09D 11/00* (2013.01); *C09D 11/106* (2013.01); *G03G 9/133* (2013.01)

(58) Field of Classification Search
CPC ........ C08G 81/027; C08G 7/65; C08G 11/00; C08G 11/106; G03G 9/133
USPC ........................................................ 430/114
See application file for complete search history.

(56) References Cited

U.S. PATENT DOCUMENTS

| | | | |
|---|---|---|---|
| 5,760,257 A | 6/1998 | Tanaka et al. | |
| 2009/0233062 A1* | 9/2009 | Nakamura | C08F 8/00 428/195.1 |

FOREIGN PATENT DOCUMENTS

| | | |
|---|---|---|
| EP | 0 768 321 A2 | 4/1997 |
| JP | 09-169821 | 6/1997 |
| WO | WO 01/21298 A1 | 3/2001 |

OTHER PUBLICATIONS

German Office Action dated Nov. 20, 2017 in Patent Application No. 10 2017 109 416.4 (with partial English translation).

* cited by examiner

*Primary Examiner* — Mark A Chapman
(74) *Attorney, Agent, or Firm* — Oblon, McClelland, Maier & Neustadt, L.L.P.

(57) ABSTRACT

Polyallylamine derivatives including 10 to 450 structural units represented by Formula (1):

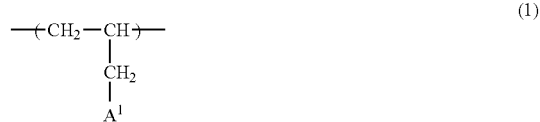

are useful for preparing dispersants, treated particles, particle-containing compositions, pigment-containing compositions, paints, ink compositions, liquid developers, and anti-blocking agents.

13 Claims, No Drawings

POLYALLYLAMINE DERIVATIVE

CROSS REFERENCES TO RELATED APPLICATIONS

This application claims priority to Japanese Patent Application No. 2016-097275, filed on May 13, 2016, which is incorporated herein by reference in its entirety.

BACKGROUND OF THE INVENTION

Field of the Invention

The present invention relates to polyallylamine derivatives. In addition, the present invention relates to dispersants, treated particles, particle-containing compositions, paints, ink compositions, liquid developers, and anti-blocking agents which contain such a polyallylamine derivative.

Discussion of the Background

A color filter used for producing a liquid crystal color display, an image pickup device, and the like is produced by using a dispersed pigment. Such a dispersed pigment is prepared, for example, by using a pigment dispersant as described in Japanese Patent Application Publication No, H09-169821, which is incorporated herein by reference in its entirety.

SUMMARY OF THE INVENTION

It is one object of the present invention to provide novel polyallylamine derivatives which are useful as a dispersant.

It is another object of the present invention to provide novel dispersants, treated particles, particle-containing compositions, paints, ink compositions, liquid developers, and anti-blocking agents which contain such a polyallylamine derivative.

These and other objects, which will become apparent during the following detailed description, have been achieved by the inventors' discovery of the polyaalyamine derivatives described below.

Thus, the present invention provides:

(1) A polyallylamine derivative comprising 10 to 450 structural units represented by Formula (1):

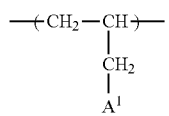
(1)

wherein in Formula (1), $A^1$ represents a group represented by Formula (2), Formula (3), Formula (4), or Formula (5), and a plurality of $A^1$s are optionally the same as or different from each other; with the proviso that at least one of $A^1$s is a group represented by Formula (4) or Formula (5):

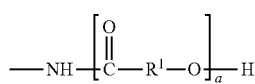
(2)

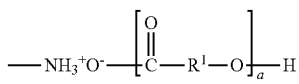
(3)

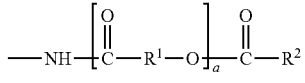
(4)

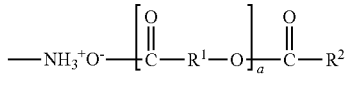
(5)

wherein in Formulae (2) and (3), $R^1$ represents an alkylene group optionally having a substituent, an alkenylene group optionally having a substituent, or an alkylene group having an ether bond optionally having a substituent; a represents an integer of 0 to 100; a plurality of $R^1$s are the same as or different from each other;

in Formulae (4) and (5), $R^1$ represents an alkylene group optionally having a substituent, an alkenylene group optionally having a substituent, or alkylene group having an ether bond optionally having a substituent; $R^2$ represents an alkyl group optionally having a substituent, an alkenyl group optionally having a substituent, a phenyl group optionally having a substituent, or an alkyl group having an ether bond optionally having a substituent; a represents an integer of 0 to 100; and a plurality of $R^1$s are the same as or different from each other.

(2) The polyallylamine derivative according to (1), wherein $N_{R2}/(N_{R1}+N_{R2}) \times 100$ is 1 to 35 where $N_{R1}$ is an average number of moles of $R^1$ present in the molecules of the polyallylamine derivative and $N_{R2}$ is an average number of moles of $R^2$ present in the molecules of the polyallylamine derivative.

(3) The polyallylamine derivative according to (1) or (2), wherein the polyallylamine derivative has a side chain mass/main chain mass of 6 to 28.

(4) The polyallylamine derivative according to any one of (1) to (3), wherein the polyallylamine derivative has an amine value of 5 mg KOH/g to 150 mg KOH/g.

(5) The polyallylamine derivative according to any one of (1) to (4), wherein $R^1$ comprises a branched alkylene group having 6 to 30 carbon atoms optionally having a substituent.

(6) The polyallylamine derivative according to any one of (1) to (5), wherein $R^2$ comprises an alkyl group having 10 to 20 carbon atoms optionally having a substituent or an alkenyl group having 2 to 30 carbon atoms optionally having a substituent.

(7) The polyallylamine derivative according to any one of (1) to (6), wherein the polyallylamine derivative has an acid value of 1 mg KOH/g to 10 mg KOH/g.

(8) A dispersant, comprising a polyallylamine derivative according to any one of (1) to (7).

(9) Treated particles treated with a dispersant according to (8).

(10) A particle-containing composition, comprising a polyallylamine derivative according to any one of (1) to (7) and particles.

(11) A paint, comprising a particle-containing composition according to (10).

(12) An ink composition, comprising a particle-containing composition according to (10).

(13) A liquid developer, comprising a particle-containing composition according to (10).

(14) An anti-blocking agent, comprising a particle-containing composition according to (10).

Effect of the Invention

According to the present invention, the polyallylamine derivative, and the dispersant, the treated particles, the particle-containing composition, the paint, the ink composition, the liquid developer, and the anti-blocking agent containing the polyallylamine derivative can be provided.

DETAILED DESCRIPTION OF THE PREFERRED EMBODIMENTS

Hereinafter, the polyallylamine derivative of the present invention, and the dispersant, the treated particles, the particle-containing composition, the paint, the ink composition, the liquid developer, and the anti-blocking agent containing the polyallylamine derivative will be described in detail.

In the present specification, the term "optionally having a substituent" provided immediately after a compound or a group means both the case where the hydrogen atom of the compound or the group is not substituted with a substituent and the case where a part or all of the hydrogen atoms of the compound or the group are substituted with substituents.

In the present specification, the term "$C_r$-$C_s$" (r and s are positive integers and satisfy r<s) means that the number of carbon atoms of the organic group described immediately after the term is r to s. For example, a "$C_1$-$C_{10}$ alkyl group" represents an alkyl group having 1 to 10 carbon atoms, and a "$C_1$-$C_{10}$ alkyl ester" represents an ester with an alkyl group having 1 to 10 carbon atoms.

In the present specification, an alkylene group and an alkenylene group are generic names of a linear, branched, or cyclic alkylene group and alkenylene group, unless otherwise specified. The cyclic alkylene group and alkenylene group may be either a monocyclic or polycyclic group. The same applies to other functional groups.

Polyallylamine Derivative

The polyallylamine derivative of the present invention has 10 to 450 structural units represented by Formula (1):

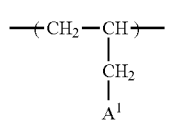
(1)

wherein in Formula (1), $A^1$ represents a group represented by Formula (2), Formula (3), Formula (4), or Formula (5); and a plurality of $A^1$s may be the same as or different from each other; with the proviso that at least one of $A^1$s is a group represented by Formula (4) or Formula (5).

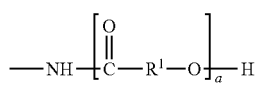
(2)

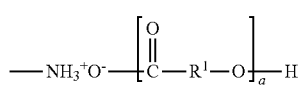
(3)

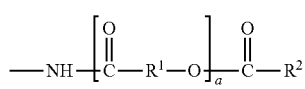
(4)

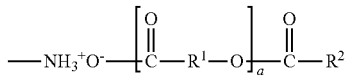
(5)

wherein in Formulae (2) and (3), $R^1$ represents an alkylene group optionally having a substituent, an alkenylene group optionally having a substituent, or an alkylene group having an ether bond optionally having a substituent; a represents an integer of 0 to 100; and a plurality of $R^1$s are the same as or different from each other;

in Formulae (4) and (5), $R^1$ represents an alkylene group optionally having a substituent, an alkenylene group optionally having a substituent, or an alkylene group having an ether bond optionally having a substituent; $R^2$ represents an alkyl group optionally having a substituent; an alkenyl group optionally having a substituent, a phenyl group optionally having a substituent, or an alkyl group having an ether bond optionally having a substituent; a represents an integer of 0 to 100; and a plurality of $R^1$s are the same as or different from each other.

The polyallylamine derivative of the present invention has 10 to 450 structural units represented by Formula (1) and at least one of $A^1$s (10 to 450 structural units) in Formula (1) is a group represented by Formula (4) or Formula (5). The group represented by Formula (4) or Formula (5) is a group in the form having a terminal group that is not a reactive group such as a hydroxy group. The inventors of the present invention have found that a polyallylamine derivative can be used as a dispersant that can excellently disperse particles in a low polarity solution and a particle-containing composition by introducing at least one group having such a form at a site corresponding to the side chain of the polyallylamine derivative.

The polyallylamine derivative of the present invention has 10 to 450 structural units, preferably 25 to 300 structural units, and more preferably 40 to 180 structural units represented by Formula (1).

The polyallylamine derivative of the present invention may have other structural units other than the structure unit represented by Formula (1). The other structural units are not limited to particular examples, and are preferably structural units derived from any monomers copolymerizable with monomers that can be the structural unit represented by Formula (1). Examples of the monomers copolymerizable with the monomers that can be the structural unit represented by Formula (1) include diallylamine, dimethylallylamine, methoxycarbonylated allylamine, methylcarbonylated allylamine, and allylamine containing a urea group.

In Formula (1), $A^1$ represents a group represented by Formula (2), Formula (3), Formula (4), or Formula (5), with the proviso that at least one of the plurality of $A^1$ is a group represented by Formula (4) or Formula (5). All the $A^1$s are preferably the groups represented by Formula (4) or Formula (5).

$R^1$ in Formulae (2) and (3) represents an alkylene group optionally having a substituent, an alkenylene group optionally having a substituent, or an alkylene group having an ether bond optionally having a substituent.

The alkylene group optionally having a substituent represented by $R^1$ preferably includes an alkylene group having 1 to 30 carbon atoms, more preferably an alkylene group having 6 to 30 carbon atoms, further preferably an alkylene group having 10 to 20 carbon atoms, and particularly preferably an alkylene group having 13 to 20 carbon atoms.

The above number of carbon atoms does not include the number of carbon atoms of the substituent. The alkylene group represented by $R^1$ may be any of a linear, branched, or cyclic alkylene group, and is preferably the linear or branched alkylene group, more preferably the branched alkylene group, and further preferably the branched alkylene group having 6 to 30 carbon atoms. In other words, preferably, at least one of $R^1$s includes a branched alkylene group having 6 to 30 carbon atoms optionally having a substituent.

Examples of such an alkylene group include a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, a 1-hexylundecylene group, an octadecylene group (a stearylene group), a nonadecylene group, a cyclohexylene group, a decahydronaphthanylene group, a norbornanylene group, and an adamantanylene group. Among these, the 1-hexylundecylene group, the heptadecylene group, the stearylene group, and the nonadecylene group are preferable, and the 1-hexylundecylene group and the heptadecylene group are more preferable.

The alkenylene group optionally having a substituent represented by $R^1$ preferably includes an alkenylene group having 1 to 30 carbon atoms, more preferably an alkenylene group having 6 to 30 carbon atoms, and further preferably an alkenylene group having 10 to 20 carbon atoms, and particularly preferably an alkenylene group having 13 to 20 carbon atoms. The above number of carbon atoms does not include the number of carbon atoms of the substituent. The alkenylene group represented by $R^1$ may be any of a linear, branched, or cyclic alkenylene group, and is preferably the linear or branched alkenylene group. Preferably, at least one of $R^1$s includes an alkenylene group having 6 to 30 carbon atoms optionally having a substituent.

Examples of such an alkenylene group include a 1-hexenylene group, a 1-heptenylene group, a 1-octenylene group, a 1-nonenylene group, a 1-decenylene group, a 1-undecenylene group, a 1-dodecenylene group, a 1-tridecenylene group, a 1-tetradecenylene group, a 1-pentadecenylene group, a 1-hexadecenylene group, a 1-heptadecenylene group, an 8-heptadecenylene group, a 1-octadecenylene group, a 1-nonadecenylene group, a 1-cyclohexenylene group, and a heptadeca-8,11-dienylene group. The 8-heptadecenylene group and a heptadeca-8,11-dienylene group are preferable and the heptadeca-8,11-dienylene group is more preferable.

Examples of the alkylene group having an ether bond optionally having a substituent represented by $R^1$ include an oxyalkylene group, an alkyleneoxy group, an oxyalkyleneoxy group, an alkyleneoxyalkylene group, and an alkyleneoxyalkyleneoxyalkylene group. The alkylene group having an ether bond optionally having a substituent preferably includes an alkylene group having an ether bond having 1 to 30 carbon atoms, more preferably an alkylene group having an ether bond having 6 to 30 carbon atoms, further preferably an alkylene group having an ether bond having 10 to 20 carbon atoms, and particularly preferably an alkylene group having an ether bond having 13 to 20 carbon atoms. The above number of carbon atoms does not include the number of carbon atoms of the substituent. The alkylene group may be any of a linear, branched, or cyclic alkylene group, and is preferably the linear or branched alkylene group. At least one of $R^1$s preferably includes an alkylene group having an ether bond having 6 to 30 carbon atoms optionally having a substituent.

Examples of such an alkylene group having an ether bond include an oxyhexylene group, an oxyheptylene group, an oxyoctylene group, an oxynonylene group, an oxydecylene group, an oxyundecylene group, an oxidodecylene group, an oxytridecylene group, an oxytetradecylene group, an oxypentadecylene group, an oxyhexadecylene group, an oxyheptadecylene group, a 1-hexyloxyundecylene group, an oxyoctadecylene group, an oxynonadecylene group, a cyclooxyhexylene group, an oxydecahydronaphthanylene group, an oxynorbornanylene group, and an oxyadamantanylene group.

The alkylene group, the alkenylene group, or the alkylene group having an ether bond represented by $R^1$ may have a substituent. The substituent is not limited to particular examples, and examples thereof include a halogen atom, an alkyl group, a cycloalkyl group, an alkoxy group, a cycloalkyloxy group, an aryl group, an aryloxy group, an arylalkyl group, an arylalkoxy group, a monovalent heterocyclic group, an alkylidene group, an amino group, a silyl group, an acyl group, an acyloxy group, a carboxy group, a sulfo group, a cyano group, a nitro group, a hydroxy group, a mercapto group, and an oxo group.

Examples of the halogen atom used as the substituent include a fluorine atom, a chlorine atom, a bromine atom, and an iodine atom.

The alkyl group used as the substituent may be either a linear or branched alkyl group. The number of carbon atoms of the alkyl group is preferably 1 to 20, more preferably 1 to 14, further preferably 1 to 12, further more preferably 1 to 6, and particularly preferably 1 to 3. Examples of the alkyl group include a methyl group, an ethyl group, a propyl group, an isopropyl group, a butyl group, a sec-butyl group, an isobutyl group, a tert-butyl group, a pentyl group, a hexyl group, a heptyl group, an octyl group, a nonyl group, and a decyl group. The alkyl group used as the substituent may further have a substituent ("secondary substituent"). Examples of the alkyl group having such a secondary substituent include an alkyl group substituted with a halogen atom, and specific examples thereof include a trifluoromethyl group, a trichloromethyl group, a tetrafluoroethyl group, and a tetrachloroethyl group.

The number of carbon atoms of the cycloalkyl group used as the substituent is preferably 3 to 20, more preferably 3 to 12, and further preferably 3 to 6. Examples of the cycloalkyl group include a cyclopropyl group, a cyclobutyl group, a cyclopentyl group, and a cyclohexyl group.

The alkoxy group used as the substituent may be either a linear or branched alkoxy group. The number of carbon atoms of the alkoxy group is preferably 1 to 20, more preferably 1 to 12, and further preferably 1 to 6. Examples of the alkoxy group include a methoxy group, an ethoxy group, a propyloxy group, an isopropyloxy group, a butoxy group, a sec-butoxy group, an isobutoxy group, a tert-butoxy group, a pentyloxy group, a hexyloxy group, a heptyloxy group, an octyloxy group, a nonyloxy group, and a decyloxy group.

The number of carbon atoms of the cycloalkyloxy group used as the substituent is preferably 3 to 20, more preferably 3 to 12, and further preferably 3 to 6. Examples of the cycloalkyloxy group include a cyclopropyloxy group, a cyclobutyloxy group, a cyclopentyloxy group, and a cyclohexyloxy group.

The aryl group used as the substituent is a group obtained by removing one hydrogen atom of the aromatic ring from an aromatic hydrocarbon. The number of carbon atoms of the aryl group used as the substituent is preferably 6 to 24, more preferably 6 to 18, further preferably 6 to 14, and further more preferably 6 to 10. Examples of the aryl group include a phenyl group, a naphthyl group, and an anthracenyl group.

The number of carbon atoms of the aryloxy group as the substituent is preferably 6 to 24, more preferably 6 to 18, further preferably 6 to 14, and further more preferably 6 to 10. Examples of the aryloxy group used as the substituent include a phenoxy group, a 1-naphthyloxy group, and a 2-naphthyloxy group.

The number of carbon atoms of the arylalkyl group as the substituent is preferably 7 to 25, more preferably 7 to 19, further preferably 7 to 15, and further more preferably 7 to 11. Examples of the arylalkyl group include a phenyl-$C_1$-$C_{12}$ alkyl group, a naphthyl-$C_1$-$C_{12}$ alkyl group, and an anthracenyl-$C_1$-$C_{12}$ alkyl group.

The number of carbon atoms of the arylalkoxy group as the substituent is preferably 7 to 25, more preferably 7 to 19, further preferably 7 to 15, and further more preferably 7 to 11. Examples of the arylalkoxy group include a phenyl-$C_1$-$C_{11}$ alkoxy group and a naphthyl-$C_1$-$C_{12}$ alkoxy group.

The monovalent heterocyclic group used as the substituent refers to a group obtained by removing one hydrogen atom from the heterocyclic ring of the heterocyclic compound. The number of carbon atoms of the monovalent heterocyclic group is preferably 3 to 21, more preferably 3 to 15, and further preferably 3 to 9. The monovalent heterocyclic group also includes a monovalent aromatic heterocyclic group (heteroaryl group). Examples of the monovalent heterocyclic ring include a thienyl group, a pyrrolyl group, a furanyl group, a furyl group, a pyridyl group, a pyridazinyl group, a pyrimidyl group, a pyrazinyl group, a triazinyl group, a pyrrolidyl group, a piperidyl group, a quinolyl group, and an isoquinolyl group.

The alkylidene group used as the substituent refers to a group obtained by removing two hydrogen atoms from the same carbon atom of an alkane. The number of carbon atoms of the alkylidene group is preferably 1 to 20, more preferably 1 to 14, further preferably 1 to 12, further more preferably 1 to 6, and particularly preferably 1 to 3. Examples of the alkylidene group include a methylidene group, an ethylidene group, a propylidene group, an isopropylidene group, a butylidene group, a sec-butylidene group, an isobutylidene group, a tert-butylidene group, a pentylidene group, a hexylidene group, a heptylidene group, an octylidene group, a nonylidene group, and a decylidene group.

The acyl group used as the substituent refers to a group represented by the formula: —C(=O)—R (where R is an alkyl group or an aryl group). The alkyl group represented by R may be either a linear or branched alkyl group. Examples of the aryl group represented by R include a phenyl group, a naphthyl group, and an anthracenyl group. The number of carbon atoms of the acyl group is preferably 2 to 20, more preferably 2 to 13, and further preferably 2 to 7. Examples of the acyl group include an acetyl group, a propionyl group, a butyryl group, an isobutyryl group, a pivaloyl group, and a benzoyl group.

The acyloxy group used as a substituent refers to a group represented by the formula: —O—C(=O)—R (where R is an alkyl group or an aryl group). The alkyl group represented by R may be either a linear or branched alkyl group. Examples of the aryl group represented by R include a phenyl group, a naphthyl group, and an anthracenyl group. The number of carbon atoms of the acyloxy group is preferably 2 to 20, more preferably 2 to 13, and further preferably 2 to 7. Examples of the acyloxy group include an acetoxy group, a propionyloxy group, a butyryloxy group, an isobutyryloxy group, a pivaloyloxy group, and a benzoyloxy group.

The above substituent may further have a substituent (hereinafter may be referred to as a "secondary substituent"). As the secondary substituent, the same substituents as those described above may be used unless otherwise specified.

a represents an integer of 0 to 100, preferably represents an integer of 0 to 15, and more preferably represents an integer of 0 to 10.

$R^1$ in Formulae (4) and (5) represents an alkylene group optionally having a substituent, an alkenylene group optionally having a substituent, or an alkylene group having an ether bond optionally having a substituent. $R^1$ in Formulae (4) and (5) is the same as $R^1$ in Formulae (2) and (3), and the preferable ranges are also the same.

$R^2$ in Formulae (4) and (5) represents an alkyl group optionally having a substituent, an alkenyl group optionally having a substituent, a phenyl group optionally having a substituent, or an alkyl group having an ether bond optionally having a substituent. The substituent is the same as the substituent that the alkylene group represented by $R^1$ in Formula (2) may have.

The alkyl group optionally having a substituent represented by $R^2$ preferably includes an alkyl group having 1 to 30 carbon atoms, more preferably an alkyl group having 5 to 25 carbon atoms, and further preferably an alkyl group having 10 to 20 carbon atoms. The above number of carbon atoms does not include the number of carbon atoms of the substituent. The alkyl group represented by $R^2$ may be any of a linear, branched, or cyclic alkyl group, and is preferably the linear or branched alkyl group. At least one of a plurality of $R^2$s preferably includes an alkyl group having 10 to 20 carbon atoms optionally having a substituent.

Examples of such an alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, a 1-hexylundecyl group, an octadecyl group, a nonadecyl group, a cyclohexyl group, a decahydronaphthanyl group, a norbornanyl group, and an adamantanyl group. The undecyl group, the heptadecyl group, and the nonadecyl group are preferable, and the undecyl group and the heptadecyl group are more preferable.

The alkenyl group optionally having a substituent represented by $R^2$ preferably includes an alkenyl group having 2 to 30 carbon atoms, more preferably an alkenyl group having 5 to 25 carbon atoms, and further preferably an alkenyl group having 10 to 20 carbon atoms. The above number of carbon atoms does not include the number of carbon atoms of the substituent. The alkenyl group represented by $R^2$ may be any of a linear, branched, or cyclic alkenyl group, and is preferably the linear or branched alkenyl group. Preferably, at least one of $R^2$s includes an alkenyl group having 2 to 30 carbon atoms optionally having a substituent.

Examples of such an alkenyl group include an ethenyl group, a propenyl group, a 1-butenyl group, a 1-pentenyl group, a 1-hexenyl group, a 1-heptenyl group, a 1-octenyl group, a 1-nonenyl group, a 1-decenyl group, a 1-undecenyl group, a 1-dodecenyl group, a 1-tridecenyl group, a 1-tetradecenyl group, a 1-pentadecenyl group, a 1-hexadecenyl group, a 1-heptadecenyl group, an 8-heptadecenyl group, a 1-octadecenyl group, a 1-nonadecenyl group, a 1-cyclohexenyl group, and a heptadeca-8,11-dienyl group. The 8-heptadecenyl group and the heptadeca-8,11-dienyl group are preferable, and the heptadeca-8,11-dienyl group is more preferable.

Examples of the alkyl group having an ether bond optionally having a substituent and represented by $R^2$ include an oxyalkyl group (alkoxy group), an alkyleneoxyalkyl group, and an alkyleneoxyalkyleneoxyalkyl group. The alkyl group having an ether bond optionally having a substituent preferably includes an alkyl group having an ether bond having 1 to 30 carbon atoms, more preferably an alkyl group having an ether bond having 5 to 25 carbon atoms, and further preferably an alkyl group having an ether bond having 10 to 20 carbon atoms. The above number of carbon atoms does not include the number of carbon atoms of the substituent. The alkyl group may be any of a linear, branched, or cyclic alkyl group, and is preferably the linear or branched alkyl group. At least one of $R^2$s preferably includes an alkyl group having an ether bond having 1 to 30 carbon atoms optionally having a substituent.

Examples of such an alkyl group having an ether bond include an oxymethyl group (methoxy group), an oxyethyl group, an oxypropyl group, an oxybutyl group, an oxypentyl group, an oxyhexyl group, an oxyheptyl group, an oxyoctyl group, an oxynonyl group, an oxydecyl group, an oxyundecyl group, an oxydodecyl group, an oxytridecyl group, an oxytetradecyl group, an oxypentadecyl group, an oxyhexadecyl group, an oxyheptadecyl group, a 1-hexyloxyundecyl group, an oxyoctadecyl group, an oxynonadecyl group, a cyclooxyhexyl group, an oxydecahydronaphthanyl group, an oxynorbornanyl group, and an oxyadamantanyl group.

In Formulae (4) and (5), $R^1$ preferably includes a branched alkylene group having 6 to 30 carbon atoms optionally having a substituent, and $R^2$ preferably includes an alkyl group having 10 to 20 carbon atoms optionally having a substituent or an alkenyl group having 2 to 30 carbon atoms optionally having a substituent.

a represents an integer of 0 to 100, preferably represents an integer of 0 to 15, and more preferably represents an integer of 0 to 10.

The polyallylamine derivative of the present invention preferably has the structure unit represented by Formula (1-1):

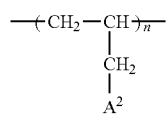

(1-1)

wherein in Formula (1-1), $A^2$ represents a group represented by Formula (2), Formula (3), Formula (4), or Formula (5); n represents an integer of 10 to 450; a plurality of $A^2$s are the same as or different from each other; with the proviso that at least one of the n number of $A^2$s is a group represented by Formula (4) or Formula (5):

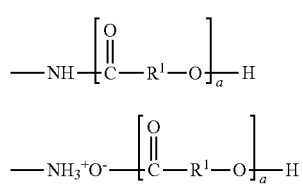

(2)

(3)

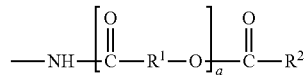

(4)

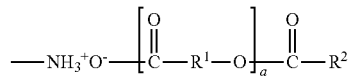

(5)

wherein in Formulae (2) and (3), $R^1$ represents an alkylene group optionally having a substituent, an alkenylene group optionally having a substituent, or an alkylene group having an ether bond optionally having a substituent; a represents an integer of 0 to 100; a plurality of $R^1$s are the same as or different from each other;

in Formulae (4) and (5), $R^1$ represents an alkylene group optionally having a substituent, an alkenylene group optionally having a substituent, or an alkylene group having an ether bond optionally having a substituent, and $R^2$ represents an alkyl group optionally having a substituent, an alkenyl group optionally having a substituent, a phenyl group optionally having a substituent, or an alkyl group having an ether bond optionally having a substituent; a represents an integer of 0 to 100; and a plurality of $R^1$s are the same as or different from each other.

$A^2$ in Formula (1-1) is the same as $A^1$ in Formula (1), and the preferable ranges are also the same.

In Formula (1-1), n represents an integer of 10 to 450, preferably represents an integer of 25 to 300, and more preferably represents an integer of 40 to 180.

The polyallylamine derivative of the present invention may have other structural units other than the structural unit represented by Formula (1-1). The other structure units are the same as described above.

The polyallylamine derivative of the present invention is preferably represented by Formula (1-2):

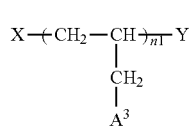

(1-2)

wherein in Formula (1-2), X and Y each independently represent a hydrogen atom, a polymerization initiator residue, or a chain transfer catalyst residue; $A^3$ is a group represented by Formula (2), Formula (3), Formula (4), or Formula (5); n1 represents an integer of 10 to 450; a plurality of $A^3$s are the same as or different from each other; with the proviso that at least one of n1 number of $A^3$s represents a group represented by Formula (4) or Formula (5):

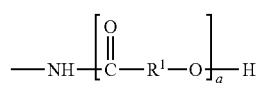

(2)

(3)

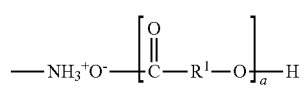

(4)

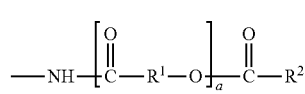

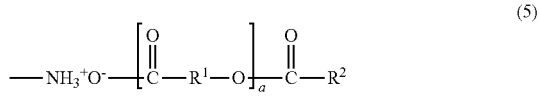

(5)

wherein in Formulae (2) and (3), $R^1$ represents an alkylene group optionally having a substituent, an alkenylene group optionally having a substituent, or an alkylene group having an ether bond optionally having a substituent; a represents an integer of 0 to 100; a plurality of $R^1$s are the same as or different from each other;

in Formulae (4) and (5), $R^1$ represents an alkylene group optionally having a substituent, an alkenylene group optionally having a substituent, or alkylene group having an ether bond optionally having a substituent; $R^2$ represents an alkyl group optionally having a substituent, an alkenyl group optionally having a substituent, a phenyl group optionally having a substituent, or an alkyl group having an ether bond optionally having a substituent; a represents an integer of 0 to 100; and a plurality of $R^1$s are the same as or different from each other.

In Formula (1-2), X and Y each independently represent a hydrogen atom, a polymerization initiator residue, or a chain transfer catalyst residue.

The polymerization initiator residue is the residue of the polymerization initiator used for obtaining the polyallylamine used for producing the polyallylamine derivative of the present invention. Examples of the polymerization initiator residue include a polymerization initiator residue that will be described below. Specific examples include the residues of ketone peroxides such as methyl ethyl ketone peroxide, the residues of diacyl peroxides such as benzoyl peroxide, the residues of peroxydicarbonates such as diisopropyl peroxydicarbonate, the residues of peroxyketals such as 1,1-bis(t-butylperoxy)cyclohexane, the residues of hydroperoxides such as t-butyl hydroperoxide, and the residues of peroxyesters such as t-butyl peroxypivalate, and in addition the residue of azobisisobutyronitrile, the residue of hydrogen peroxide, and the residues of ferrous salts. In addition, the residue of a polymerization initiator described in Japanese Examined Patent Application Publication No. H2-14364, which is incorporated herein by reference in its entirety, may be used. These may be used singly or in combination.

The chain transfer catalyst residue is a residue of a chain transfer catalyst used in obtaining the polyallylamine used for producing the polyallylamine derivative of the present invention, Examples of the chain transfer catalyst residue include a chain transfer catalyst residue that will be described below. Specific examples include the residues of alkyl mercaptans such as lauryl mercaptan, the residues of thiocarboxylic acids such as mercaptoacetic acid, 2-mercaptopropionic acid, and 3-mereaptopropionic acid, and the residues of the thiocarboxylic acid esters such as butyl thioglycolate and 2-ethylhexyl thioglycolate. These may be used singly or in combination.

$A^3$ in Formula (1-2) is the same as $A^1$ in Formula (1), and the preferable ranges are also the same.

In Formula (1-2), n1 represents an integer of 10 to 450, preferably represents an integer of 25 to 300, and more preferably represents an integer of 40 to 180.

In Formula (1), the group represented by Formula (4) and/or Formula (5) is preferably present in 20% to 100%, more preferably present in 30% to 100%, and further preferably present in 40% to 100% in 10 to 450 $A^1$s. The group represented by Formula (4) and/or Formula (5) having a content of 20% or more allows the affinity with a low polarity solution and a particle-containing composition to be high and thus particles and the like to be excellently dispersed. Similarly, in Formulae (1-1) and (1-2), the group represented by Formula (4) or Formula (5) is preferably present in 20% to 100%, more preferably present in 30% to 100%, and further preferably present in 40% to 100% in n number of $A^2$s or n1 number of $A^3$s.

In Formula (1), groups bonded to Formula (1) through amide bonds as represented by Formulae (2) and (4) is preferably present in 30% to 90% and more preferably present in 40% to 80% in 10 to 450 $A^1$& Bonds of 30% to 90% $A^1$s in 10 to 450 $A^1$s to the polyallylamine through amide bonds allow aggregation of particles to be reduced and a viscosity lowering effect, a viscosity stabilizing effect, a particle diameter reduction effect, an ink performance stabilizing effect, and coating film appearance to be improved. Similarly, in Formulae (1-1) and (1-2), groups bonded to Formulae (1-1) or (1-2) through amide bonds as represented by Formulae (2) and (4) preferably present in 30% to 90% and more preferably present in 40% to 80% in n number of $A^2$ or n1 number of $A^3$.

From the viewpoint of high affinity with the low polarity solution and the particle-containing composition, $N_{R2}/(N_{R1}+N_{R2})\times100$ is preferably 1 to 35, more preferably 5 to 25, and further preferably 10 to 20 where $N_{R1}$ is the average number of moles of all $R^1$ present in the molecules of the polyallylamine derivative of the present invention and $N_{R2}$ is the average number of moles of all $R^2$ present in the molecules of the polyallylamine derivative. The average numbers of moles of $R^1$ and $R^2$ can be measured in accordance with the method described in "Measurement of $N_{R2}/(N_{R1}+N_{R2})\times100$" described below.

The side chain mass/main chain mass of the polyallylamine derivative of the present invention is preferably 6 to 28, more preferably 10 to 20, and further preferably 10 to 15, from the viewpoint of satisfying both high affinity with the low polarity solution and the particle-containing composition and adsorption and binding properties to particles. The side chain refers to "—$CH_2$-$A^1$" in Formula (1) ("—$CH_2$-$A^2$" in Formula (1-1) and "—$CH_2$-$A^3$" in Formula (1-2)) and the main chain refers to the part excluding "—$CH_2$-$A^1$" in Formula (1) ("—$CH_2$-$A^2$" in the Formula (1-1) and "—$CH_2$-$A^3$" in the Formula (1-2)). The side chain mass/main chain mass can be measured in accordance with the method described in "Side chain mass/main chain mass" described below.

The amine value of the polyallylamine derivative of the present invention is preferably 5 mg KOH/g to 150 mg KOH/g, more preferably 10 mg KOH/g to 60 mg KOH/g, and further preferably 15 mg KOH/g to 50 mg KOH/g, from the viewpoint of particle dispersibility. The amine value can be measured in accordance with the method described in "Measurement of amine value of polyallylamine derivative" described below.

The acid value of the polyallylamine derivative of the present invention is preferably 1 mg KOH/g to 10 mg KOH/g, more preferably 2 mg KOH/g to 7 mg KOH/g, and further preferably 2 mg KOH/g to 5 mg KOH/g, from the viewpoint of particle dispersibility. The acid value can be measured in accordance with the method described in "Measurement of acid value of polyallylamine derivative" described below.

The weight average molecular weight of the polyallylamine derivative of the present invention is preferably 500 to 500,000 and more preferably 2,000 to 100,000. The weight average molecular weight can be measured by gel permeation chromatography (GPC).

Method for Producing Polyallylamine Derivative

The method for producing the polyallylamine derivative of the present invention is not limited to particular examples, and as one preferable embodiment, the polyallylamine derivative can be produced by reacting a polyester with a polyallylamine.

The polyallylamine used for producing the polyallylamine derivative of the present invention can be obtained by polymerizing allylamine in the presence of a polymerization initiator and/or a chain transfer catalyst.

The polymerization initiator is not limited to particular examples and example thereof include ketone peroxides such as methyl ethyl ketone peroxide, diacyl peroxides such as benzoyl peroxide, peroxydicarbonates such as diisopropyl peroxydicarbonate, peroxyketals such as 1,1-bis(t-butylperoxy)cyclohexane, hydroperoxides such as t-butyl hydroperoxide, and peroxyesters such as t-butyl peroxypivalate, and in addition azobisisobutyronitrile, hydrogen peroxide, and ferrous salts. In addition, the polymerization initiator described in Japanese Examined Patent Application Publication No. H2-14364, which is incorporated herein by reference in its entirety, may be used. These polymerization initiators may be used singly or in combination of two or more of them.

The chain transfer catalyst is not limited to particular examples and examples thereof include alkyl mercaptans such as lauryl mercaptan, thiocarboxylic acids such as mercaptoacetic acid, 2-mercaptopropionic acid, and 3-mercaptopropionic acid, and thiocarboxylic acid esters such as butyl thioglycolate and 2-ethylhexyl thioglycolate. These chain transfer catalysts may be used singly or in combination of two or more of them.

The weight average molecular weight of the polyallylamine used for producing the polyallylamine derivative of the present invention is preferably 150 to 100,000 and more preferably 600 to 20,000. The polyallylamine having a weight average molecular weight of 150 or more allows adsorption power to the particles to be improved and the particle dispersibility to be improved, while the polyallylamine having a weight average molecular weight of 100,000 or less allows aggregation of the particles to be reduced and the particle dispersibility to be improved. Polyallylamine having any weight average molecular weights may be produced by the method described in Japanese Examined Patent Application Publication No. H2-14364, which is incorporated herein by reference in its entirety.

Commercially available products can be used as the polyallylamine used for producing the polyallylamine derivative of the present invention. Examples of the commercially available products of polyallylamine include "PAA-01," "PAA-03," "PAA-05," "PAA-08," "PAA-15", "PAA-15C," and "PAA-25" manufactured by Nittobo Medical Co., Ltd.

The polyester used in the production of the polyallylamine derivative of the present invention is not limited to particular examples, and examples of the polyester include a polyester represented by Formula (I) and a polyester obtained by reacting a polyester represented by Formula (I) with a carboxylic acid represented by Formula (II).

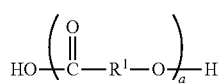

(I)

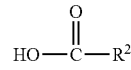

(II)

wherein in Formula (I), $R^1$ and a are the same as $R^1$ and a in Formula (2) and Formula (3); and in Formula (II), $R^2$ is the same as $R^2$ in Formula (4) and Formula (5).

The polyallylamine derivative of the present invention has at least one group represented by Formulae (4) and (5), from the viewpoint of obtaining a high affinity with a low polarity solution, a particle-containing composition and the like and having high dispersant performance under the same environment. Therefore, in order to produce the polyallylamine derivative of the present invention, as a polyester to be reacted with the polyallylamine, at least one polyester (the precursor of the group represented by Formulae (4) and (5)) obtained by reacting the polyester represented by Formula (I) with the carboxylic acid represented by Formula (II) is required to be used.

As the carboxylic acid represented by Formula (II), a commercially available product may be used or the carboxylic acid may be produced by using a hydroxy acid represented by Formula (III) may be used as a raw material.

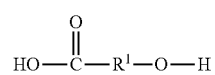

(III)

wherein in Formula (III), $R^1$ are the same as $R^1$ in Formula (2) and Formula (3).

Specifically, a polyester composition in which the polyester represented by Formula (I) (a precursor of a group represented by Formulae (2) and (3)) and a polyester obtained by reacting the polyester represented by Formula (I) and the carboxylic acid represented by Formula (II) (a precursor of a group represented by Formulae (4) and (5)) are mixed can be produced by heating the mixture of the hydroxy acid represented by Formula (III) and the carboxylic acid represented by Formula (II). A polymerization catalyst may be used, if necessary.

The reaction temperature is preferably 120° C. to 220° C. and more preferably 140° C. to 210° C. The reaction time is preferably 0.5 hour to 72 hours. The reaction carried out under a nitrogen stream allows a polyester having a high polymerization degree to be obtained.

Examples of the hydroxy acid represented by Formula (III) include ricinoleic acid, 9- and 10-hydroxystearic acid, 12-hydroxystearic acid, castor oil fatty acid, hydrogenated castor oil fatty acid, lactic acid, and the mixture thereof. 12-Hydroxystearic acid is preferable.

Examples of the polymerization catalyst include quaternary ammonium salts such as tetramethylammonium chloride, tetrabutylammonium chloride, tetramethylammonium bromide, tetrabutylammonium bromide, tetramethylammonium iodide, tetrabutylammonium iodide, benzyltrimethylammonium chloride, benzyltrimethylammonium bromide, and benzyltrimethylammonium iodide, quaternary phosphonium salts such as tetramethylphosphonium chloride, tetrabutylphosphonium chloride, tetramethylphosphonium bromide, tetrabutylphosphonium bromide, tetramethylphosphonium iodide, tetrabutylphosphonium iodide, benzyltrimethylphosphonium chloride, benzyltrimethylphosphonium bromide, benzyltrimethylphosphonium iodide, tetraphenylphosphonium chloride, tetraphenylphosphonium bromide, and tetraphenylphosphonium iodide, and in addition, phosphorus compounds such as triphenylphosphine, organic carboxylic acid salts such as potassium acetate, sodium acetate, potassium benzoate, and sodium benzoate, alkali metal alcoholates such as sodium alcoholate and potassium alcoholate, and in addition, tertiary amines, organotin compounds, organoaluminum compounds, organic titanate compounds such as tetrabutyl titanate, and zinc compounds such as zinc chloride.

When a in Formula (I) is 1, the hydroxy acid represented by Formula (III) may be used as the carboxylic acid represented by Formula (I).

As the carboxylic acid represented by Formula (II), commercially available products may be used or the carboxylic acids may be produced by known methods.

Examples of the carboxylic acid represented by Formula (II) include formic acid, acetic acid, propionic acid, butyric acid, valeric acid, caproic acid, enanthic acid, caprylic acid, pelargonic acid, capric acid, laurie acid, myristic acid, palmitin acid, margaric acid, stearic acid, oleic acid, linoleic acid, linolenic acid, arachidonic acid, eicosapentaenoic acid, docosahexaenoic acid, sorbic acid, and benzoic acid.

When the polyester composition is produced, the content of the carboxylic acid represented by Formula (II) is preferably 3% by mass to 35% by mass and more preferably 5% by mass to 32% by mass relative to the content of the hydroxy acid represented by Formula (III).

The calculated molecular weight of the polyester used for producing the polyallylamine derivative of the present invention is preferably 200 to 10,000 and more preferably 500 to 5,000, from the viewpoint of the dispersing performance of pigments. The calculated molecular weight of the carboxylic acid can be measured in accordance with the method described in "Calculated molecular weight of polyester" described below. A carboxylic acid having such calculated molecular weight can be obtained by setting the molar ratio of the hydroxy acid used as the raw material and the carboxylic acid represented by Formula (II) and observing the acid value of a reaction product on the way of the reaction to find out an appropriate reaction time.

The acid value of the polyester used for producing the polyallylamine derivative of the present invention is preferably 5 mg KOH/g to 280 mg KOH/g and more preferably 10 mg KOH/g to 120 mg KOH/g.

As one preferred embodiment of the method for producing the polyallylamine derivative of the present invention, the polyester is reacted with the polyallylamine. Specifically, the polyester is introduced into the side chain of the polyallylamine. The reaction condition is the same as the reaction condition of carboxylic acid produced by using a hydroxy acid represented by Formula (III). The polymerization catalyst may be used, if necessary.

The ratio of amide bonding of the amino group of the polyallylamine can be determined by measuring the amine value A immediately after mixing at least one polyester and the amine value B after completion of the reaction, and calculating difference of these values in accordance with the following calculation formula. If the amino group of the polyallylamine and the carboxy group of the polymer introduced into the side chain form a salt, the determined amine value is not affected at all.

Amide bond ratio of polyallylamine derivative:

$$((\text{Amine value } A - \text{Amine value } B)/\text{Amine value } A) \times 100$$

The weight ratio of the polyallylamine and the polyester (polyallylamine/polyester) is preferably 1/1 to 1/30, from the viewpoint of particle dispersibility.

Dispersant

The dispersant (particle dispersant) of the present invention includes the polyallylamine derivative of the present invention. The polyallylamine derivative of the present invention has a property of excellently dispersing particles into a resin and an organic solvent, and thus is useful as the dispersant (particle dispersant). For example, the polyallylamine derivative of the present invention also has excellent dispersibility of carbon particles, and thus can also be used as a sludge dispersant for lubricating oil. Long time use of lubricating oils for internal combustion engines (for example, gasoline engines, diesel engines, and gas engines) and lubricating oils for driving systems (for example, gear oils, hydraulic oils, automatic transmission fluids, continuously variable transmission fluids, power steering oils, and the like for automobiles) may cause various troubles to the internal combustion engine and the driving system part such as an increase in contamination and abrasion of the lubrication part caused by generating sludge and an increase in power loss. The growth of sludge can be reduced and thus the performance as a lubricating oil can be maintained for a long period by adding the polyallylamine derivative of the present invention to the lubricating oil as a sludge dispersant.

Treated Particles

The treated particles of the present invention are characterized by treating particles with the dispersant of the present invention. Examples of the treated particles of the present invention include treated inorganic particles and treated organic particles.

The particles are not limited to particular examples so long as the particles are the inorganic particles or the organic particles. Examples of the inorganic particles include inorganic pigments such as titanium dioxide, iron oxide, cadmium sulfide, calcium carbonate, barium carbonate, barium sulfate, clay, talc, chrome yellow, carbon black, cadmium yellow, cadmium red, red iron oxide, iron black, Chinese white, iron blue, and ultramarine blue. Examples of the organic particles include organic pigments such as pyrrole-based pigments including diketopyrrolopyrrole, and monoazo-based, diazo-based, azolake-based, condensed azo-based, chelate azo-based, indigo-based, thioindigo-based, anthraquinone-based, dianthraquinonyl-based, benzoiniidazolone-based, pyranthrone-based, phthalocyanine-based, halogenated phthalocyanine-based, flavanthrone-based, quinacridone-based, dioxazine-based, indanthrone-based, isoindolinone-based, isoindoline-based, quinophthalone-based, perylene-based, perinone-based, acidic dye-based, basic dye-based, azine-based, daylight fluorescent-based, nitroso-based, and nitro-based organic pigments.

In addition to the inorganic pigment described above, examples of the inorganic particles include silica, alumina, barium titanate, calcium phosphate, calcium hydrogen phosphate, magnesium oxide, magnesium hydroxide, calcium oxide, calcium hydroxide, dolomite, calcined dolomite, slaked dolomite, hydrotalcite, silicon dioxide, glass particles, silicon nitride, aluminum nitride, boron nitride, iron nitride, ferrite, strontium ferrite, barium ferrite, carbon particles, carbon nanotubes, fullerene, graphene, magnetic substances (for example, samarium cobalt, neodymium iron boron, praseodymium cobalt, and samarium iron nitrogen), and diamond.

In addition to the pigments described above, examples of the organic particles include resin particles of poly(meth)acrylate, polyester, polystyrene, silicone, polyamide, polyvinyl chloride, ABS, polyphenylene sulfide, polyamide imide, polyether sulfone, and an epoxy resin.

The average particle diameter of the particles is preferably 10 nm or larger, more preferably 30 nm or larger, and further preferably 50 nm or larger. The upper limit is preferably 1,000 μm or smaller, more preferably 100 μm or smaller, and further preferably 10 μm or smaller. The average particle diameter of the particles can be measured in accordance with the method described in "Measurement of average dispersed particle diameter" described below.

Methods for treating and dispersing particles with the dispersant of the present invention include methods using a Henschel mixer, a bead mill, a ball mill, a planetary mixer, a paint shaker, an atomizer colloid mill, and a Banbury mixer, and a dry method, a wet method, and an integral blending method. The methods, however, are not limited thereto. A method for previously treating the surfaces of particles with the dispersant and thereafter adding the treated particles to a solvent, a resin, rubber, or the like or a method for adding the dispersant at the time of adding the particles to the solvent, the resin, the rubber, or the like can be employed. When the wet method is employed, a method for treating particles in a solvent and thereafter removing the solvent and taking out the particles of which the surface is treated with the dispersant may be applicable. As the solvent used in the wet solvent method, any solvent may be used as long as the solvent dissolves the dispersant and examples thereof include aromatic compounds such as toluene and xylene, aliphatic hydrocarbons such as n-hexane, n-heptane, and isoparaffin, ketones such as MIBK (methyl isobutyl ketone) and MEK (methyl ethyl ketone), and esters such as ethyl acetate and butyl acetate. Dispersing may also be carried out while forming particles by a suspension method, a suspension polymerization method, or the like by high-speed stirring or the like in a solution in which the dispersant is dissolved.

In the treated particles, the dispersant of the present invention is preferably contained in an amount of 1% by mass to 200% by mass (in terms of the polyallylamine derivative) relative to the particles.

Particle-Containing Composition

The particle-containing composition of the present invention includes the polyallylamine derivative and the particles of the present invention. Examples of the particle-containing composition of the present invention include a pigment dispersion, an inorganic particle dispersion, an organic particle dispersion, a pigment-containing polymer composition, an inorganic particle-containing polymer composition, and an organic particle-containing polymer composition. Examples of the polymer include a resin and rubber. The particle-containing composition of the present invention may include additives such as a resin, rubber, an organic solvent, a stabilizer, an antioxidant, a plasticizer, an ultraviolet absorber, and a dispersion aid to such an extent that the additives do not impair the effect of the present invention. The particles in the particle-containing composition of the present invention may be particles treated with the dispersant or may be particles not treated with the dispersant. As the particles, particles similar to the particles described in "Treated particles" described above can be used.

Examples of the resin include alkyd resins, polyester resins, (meth)acrylic resins, epoxy resins, polyurethane resins, silicone resins, fluorine resins, melamine resins, benzoguanamine resins, urea resins, polyamide resins, phenol resins, vinyl chloride, polyethylene resins, styrene resins, acid group-containing resins, and copolymers thereof (for example, a benzyl methacrylate/methacrylic acid copolymer and a styrene/stearyl methacrylate/acrylic acid copolymer). The resin, however, is not limited thereto.

Examples of the rubber include, in addition to natural rubber, synthetic rubbers such as isoprene rubber, butadiene rubber, styrene-butadiene rubber, chloroprene rubber, nitrile rubber, polyisobutylene, ethylene-propylene rubber, chlorosulfonated polyethylene, acrylic rubber, fluoro rubber, epichlorohydrin rubber, urethane rubber, and silicone rubber. The rubber, however, is not limited thereto.

Examples of the organic solvent include hydrocarbon solvents such as toluene, xylene, high-boiling point petroleum hydrocarbons, n-hexane, cyclohexane, and n-heptane, halogenated hydrocarbon solvents such as methylene chloride, chloroform, and dichloroethane, ether solvents such as dioxane, tetrahydrofuran, ketone solvents such as methyl isobutyl ketone, cyclohexanone, and isophorone, ester solvents such as ethyl acetate, butyl acetate, ethylene glycol monoethyl ether acetate, and 2-methoxypropyl acetate, monoether-based solvents of alkylene glycols such as ethylene glycol monomethyl ether, ethylene glycol monoethyl ether, ethylene glycol monobutyl ether, propylene glycol monomethyl ether, propylene glycol monoethyl ether, and propylene glycol monobutyl ether, and in addition, amide-based solvents such as dimethylacetamide and dimethylformamide. The organic solvents, however, are not limited to particular examples and can be used as long as the organic solvents can dissolve the dispersant. These organic solvents may be used singly or in combination of two or more of them.

The particle-containing composition of the present invention can be directly prepared by kneading the dispersant of the present invention with the particles, the polymer, the organic solvent, and the like. After preparing a form of what is called particle dispersion base, a particle-containing composition can be obtained by using the particle dispersion base, the polymer, the organic solvent, and the like.

The particle dispersion base and the particle-containing composition may be prepared by dispersing the required raw material components by appropriately using a rotation/revolution mixer, a roll mill, a ball mill, a sand ground mill, a paint shaker, a kneader, a dissolver, an ultrasonic disperser, or the like. In this case, the treated particles may be kneaded with the polymer, or an integral blending method in which the dispersant, the pigment, and the polymer are simultaneously kneaded may be employed.

The particle dispersion base and particle-containing composition of the present invention can be used as a paint or a printing ink by further adding a binder polymer (a resin or rubber) or other polymers, or can be used as a paint or a printing ink as it is.

In the particle-containing composition, the dispersant of the present invention is preferably contained in an amount of 1% by mass to 200% by mass (in terms of the polyallylamine derivative) relative to the pigment.

The particle-containing composition of the present invention can also be used as a coating film or film-like composition.

The particle-containing composition of the present invention exhibits properties in which a viscosity at 25° C. is low and a viscosity after 4 weeks is also low. The viscosity at 25° C. is preferably 300 mPa·s or lower, more preferably 100 mPa·s or lower, and further preferably 50 mPa·s or lower. The lower limit is not limited to particular examples and may be 0.1 mPa·s or higher. The viscosity after 4 weeks elapsed is preferably 300 mPa·s or lower, more preferably 100 mPa·s or lower, and further preferably 50 mPa·s or lower. The lower limit is not limited to particular examples and may be 0.1 mPa·s or higher. The viscosity increase ratio (viscosity after 4 weeks elapsed/viscosity immediately after dispersion) is preferably 1.5 or lower, more preferably 1.3 or lower, and further preferably 1.2 or lower. The lower limit is not limited to particular examples and may be 1 or higher. The viscosity of the particle-containing composition can be measured in accordance with the method described in "Measurement of viscosity" described below.

The application of the particle-containing composition of the present invention is not limited to particular examples and can be used for a resin or rubber product containing the particles described above. Examples thereof include a paint, a coating material (a colored coating, a conductive coating, an antistatic coating, and the like), an ink composition, a liquid developer, an anti-blocking agent, a ceramic slurry, a conductive aid for battery electrodes and the like, a dry toner for copying, a wet toner for copying, a ceramic molded article, a bonded magnet, a rubber magnet used for copying machines and the like, a magnetic tape, a color plastic molded article used for household goods and building materials, and a sealant used for building.

Paint, Ink Composition, Liquid Developer, and Anti-Blocking Agent

The paint, the ink composition, the liquid developer, and the anti-blocking agent of the present invention include the particle-containing composition of the present invention. Specific examples of the paint of the present invention include a colored paint, an electrically conductive paint, and an antistatic paint. Specific examples of the ink composition of the present invention include a printing ink and a conductive ink. The paint or the ink composition of the present invention preferably includes additives such as a stabilizer, an antioxidant, a plasticizer, an ultraviolet absorber, and a dispersion aid to such an extent that the effect of the present invention is not impaired.

The liquid developer of the present invention is a suspension of particles in a dielectric liquid and can be used in an electrophoretic development method. The liquid developer of the present invention can be produced by mixing a resin imparting charging property and fixing property with functional particles, carbon black, an organic pigment, an inorganic pigment, or the like and further adding the polyallylamine derivative of the present invention to the mixture to prepare particles by dispersing the mixture in a dielectric liquid, and thereby forming a particle-containing composition containing the polyallylamine derivative of the present invention. In addition, the dispersant, a charge control agent, a stabilizer, and the like are preferably used at the same time, if necessary. The liquid developer of the present invention uses the particle-containing composition containing the polyallylamine derivative of the present invention, and thus exhibits excellent particle dispersibility and an electrophoretic property, whereby the particles in the liquid developer of the present invention migrate smoothly without aggregation.

The average particle diameter of the particles is preferably 20 μm or smaller, more preferably 15 μm or smaller, and further preferably 10 μm or smaller, 5 μm or smaller, or 3 μm or smaller. The lower limit is preferably 0.01 μm or larger, more preferably 0.05 μm or larger, and further preferably 0.1 μm or larger. The average particle diameter of the particles can be measured in accordance with the method described in "Performance evaluation of liquid developer" described below.

The anti-blocking agent of the present invention is used to impart unevenness to a film and to reduce adhesion between the films (anti-blocking) by kneading the anti-blocking agent in the film, or coating the anti-blocking agent on the film. The particle-containing composition of the present invention has high dispersibility of particles, and thus high anti-blocking property can be obtained even in a small amount, and poor appearance due to particle aggregation can be prevented.

Other features of the invention will become apparent in the course of the following descriptions of exemplary embodiments which are given for illustration of the invention and are not intended to be limiting thereof.

EXAMPLES

In the following description, "part" and "%" mean "part by mass" and "% by mass," respectively, unless otherwise specified.

Synthesis Example 1: Synthesis of Polyester PE-10

Into a reaction flask equipped with a thermometer, a stirrer, a nitrogen introduction port, a reflux condenser, a water separator, and a pressure reducing port, 90 parts of high purity 12-hydroxystearic acid (trade name: 12-hydro acid HP, manufactured by Ogura Synthetic Industries Ltd., purity 99% or higher) and 10 parts of stearic acid (manufactured by KANTO CHEMICAL CO., INC., special grade: purity 95% or higher) were charged, and the mixture was reacted at 150° C. under a nitrogen atmosphere, followed by heating at 200° C. at reduced pressure. Subsequently, the reacted mixture was cooled to room temperature to obtain a reaction product (referred to as "Polyester PE-10"). Polyester PE-10 had an acid value of 34.5 mg KOH/g and a calculated molecular weight of 1,626.

Synthesis Example 2: Synthesis of Polyester PE-11

As in Synthesis Example 1, except the amount of high purity 12-hydroxystearic acid (trade name: 12-hydro acid HP, manufactured by Ogura Synthetic Industries Ltd.) was changed from 90 parts to 95 parts and the amount of stearic acid (manufactured by KANTO CHEMICAL CO., INC., special grade: purity 95% or higher) was changed from 10 parts to 5 parts. A reaction product (referred to as "Polyester PE-11") was obtained in a similar manner to Synthesis Example 1 except the aforementioned matters. Polyester PE-11 had an acid value of 32.7 mg KOH/g and a calculated molecular weight of 1,716.

Synthesis Example 3: Synthesis of Polyester PE-12

As in Synthesis Example 1, except the amount of high purity 12-hydroxystearic acid (trade name: 12-hydro acid HP, manufactured by Ogura Synthetic Industries Ltd.) was changed from 90 parts to 80 parts and the amount of stearic acid (manufactured by KANTO CHEMICAL CO., INC., special grade: purity 95% or higher) was changed from 10 parts to 20 parts. A reaction product (referred to as "Polyester PE-12") was obtained in a similar manner to Synthesis Example 1 except the aforementioned matters. Polyester PE-12 had an acid value of 38.3 mg KOH/g and a calculated molecular weight of 1,465.

Synthesis Example 4: Synthesis of Polyester PE-13

A reaction product (referred to as "Polyester PE-13") was obtained in a similar manner to Synthesis Example 1 except that the reaction time was shortened in Synthesis Example 1. Polyester PE-13 had an acid value of 45.0 mg KOH/g and a calculated molecular weight of 1,247.

Synthesis Example 5: Synthesis of Polyester PE-14

As in Synthesis Example 1, except the amount of high purity 12-hydroxystearic acid (trade name: 12-hydro acid HP, manufactured by Ogura Synthetic Industries Ltd.) was changed to 75 parts and the amount of stearic acid was changed to 25 parts. A reaction product (referred to as "Polyester PE-14") was obtained in a similar manner to Synthesis Example 1 except the aforementioned matters. Polyester PE-14 had an acid value of 55.5 mg KOH/g and a calculated molecular weight of 1,011.

Synthesis Example 6: Synthesis of Polyester PE-20

As in Synthesis Example 1, except linoleic acid (produced by KANTO CHEMICAL CO., INC., special grade: purity 99% or higher) was used instead of stearic acid. A reaction product (referred to as "Polyester PE-20") was obtained in a similar manner to Synthesis Example 1 except the aforementioned matter. Polyester PE-20 had an acid value of 38.1 mg KOH/g and a calculated molecular weight of 1,472.

Synthesis Example 7: Synthesis of Polyester PE-30

As in Synthesis Example 1, except palmitic acid (manufactured by KANTO CHEMICAL CO., INC., special grade, purity: 95% or higher) was used instead of stearic acid. A reaction product (referred to as "Polyester PE-30") was obtained in a similar manner to Synthesis Example 1 except the aforementioned matter. Polyester PE-30 had an acid value of 35.3 mg KOH/g and a calculated molecular weight of 1,589.

Synthesis Example 8: Synthesis of Polyester PE-40

As in Synthesis Example 1, except lauric acid (manufactured by KANTO CHEMICAL CO., INC., special grade, purity of 99.5% or higher) was used instead of stearic acid. A reaction product (referred to as "Polyester PE-40") was obtained in a similar manner to Synthesis Example 1 except the aforementioned matter. Polyester PE-40 had an acid value of 38.6 mg KOH/g and a calculated molecular weight of 1,453.

Synthesis Example 9: Synthesis of Polyester PE-41

As in Synthesis Example 8, except the amount of high purity 12-hydroxystearic acid (trade name: 12-hydro acid HP, manufactured by Ogura Synthetic Industries Ltd.) was changed to 85 parts and the amount of laurie acid was changed to 15 parts. A reaction product (referred to as "Polyester PE-41") was obtained in a similar manner to Synthesis Example 8 except the aforementioned matters. Polyester PE-41 had an acid value of 40.1 mg KOH/g and a calculated molecular weight of 1,399.

Synthesis Example 10: Synthesis of Polyester PE-50

As in Synthesis Example 1, except instead of 10 parts of stearic acid, 5 parts of stearic acid (manufactured by KANTO CHEMICAL CO., INC., special grade: purity 95% or higher) and 5 parts of laurie acid (manufactured by KANTO CHEMICAL CO., INC., special grade: purity 99.5% or higher) were used. A reaction product (referred to as "Polyester PE-50") was obtained in a similar manner to Synthesis Example 1 except the aforementioned matters. Polyester PE-50 had an acid value of 36.4 mg KOH/g and a calculated molecular weight of 1,541.

Synthesis Example 11: Synthesis of Polyester PE-00

As in Synthesis Example 1, except the amount of added high purity 12-hydroxystearic acid (trade name: 12-hydro acid HP (manufactured by Ogura Synthetic Industries Ltd.)) was changed from 90 parts to 100 parts and stearic acid was not used. A reaction product (referred to as "Polyester PE-00") was obtained in a similar manner to Synthesis Example 1 except the aforementioned matters. Polyester PE-00 had an acid value of 31.0 mg KOH/g and a calculated molecular weight of 1,810.

Measurement of Acid Value of Polyester

The acid value of the polyester was measured by titrating a polyester solution prepared by dissolving 0.5 g of polyester in 40 mL of a xylene (mixture of ortho, meta, and para forms)/ethanol mixture (1/1 mass ratio) with a potassium hydroxide/ethanol solution (0.1 mol/L) and determining the discoloration point with a phenolphthalein indicator.

Calculation of Molecular Weight of Polyester

The average molecular weight value was determined by calculating (56,100/Acid value of polyester) using the acid value determined in "Measurement of acid value of polyester" described above.

Synthesis of Polyallylamine Derivative

Example 1

In a reaction flask equipped with a thermometer, a stirrer, a nitrogen introduction port, a reflux condenser, a water separator, and a pressure reducing port, 6.7 parts of "PAA-08" (manufactured by Nittobo Medical Co., Ltd., a 15% aqueous polyallylamine solution, a weight average molecular weight of the polymer of 8,000, and an amine value of the polymer of 984 mg KOH/g) (the amount of polyallylamine is 1 part) and 7 parts of Polyester PE-10 obtained in Synthesis Example 1 were mixed at 140° C., and the mixture was heated while distilling off water, After the reaction, the mixture was cooled to room temperature to obtain Polyallylamine Derivative 1.

Examples 2 to 4

As in Example 1, except, respectively, 10 parts (Example 2), 15 parts (Example 3), and 20 parts (Example 4) of Polyester PE-10 obtained in Synthesis Example 1 were used. Polyallylamine derivatives 2 to 4 were obtained in a similar manner to Example 1 except the aforementioned matters.

Example 5

As in Example 2, except "PAA-01" (manufactured by Nittobo Medical Co., Ltd., a 15% aqueous polyallylamine solution, a polymer weight average molecular weight of the polymer of 1,600, and an amine value of the polymer of 984 mg KOH/g) was used instead of "PAA-08". A polyallylamine derivative was obtained in a similar manner to Example 2 except the aforementioned matter.

Example 6

As in Example 4, except "PAA-15C" (manufactured by Nittobo Medical Co., Ltd., a 15% aqueous polyallylamine solution, a weight average molecular weight of the polymer of 15,000, and an amine value of the polymer of 984 mg KOH/g) was used instead of "PAA-08". A polyallylamine derivative was obtained in a similar manner to Example 4 except the aforementioned matter.

Example 7

As in Example 2, except instead of "PAA-08", 5 parts of "PAA-03" (manufactured by Nittobo Medical Co., Ltd., a 20% aqueous polyallylamine solution, a weight average molecular weight of the polymer of 3,000, and an amine value of the polymer of 984 mg KOH/g) (the amount of the polyallylamine is 1 part) was used and 10 parts of Polyester PE-11 was used instead of Polyester PE-10. A polyallylamine derivative was obtained in a similar manner to Example 2 except the aforementioned matters.

Example 8

As in Example 7, except the amount of Polyester PE-11 was changed from 10 parts to 20 parts. A polyallylamine derivative was obtained in a similar manner to Example 7 except the aforementioned matter.

Example 9

As in Example 1, except Polyester PE-12 was used instead of Polyester PE-10. A polyallylamine derivative was obtained in a similar manner to Example 1 except the aforementioned matter.

Example 10

As in Example 2, except Polyester PE-12 was used instead of Polyester PE-10. A polyallylamine derivative was obtained in a similar manner to Example 2 except the aforementioned matter.

Example 11

As in Example 3, except instead of "PAA-08", 5 parts of "PAA-03" (manufactured by Nittobo Medical Co., Ltd., a 20% aqueous polyallylamine solution, a weight average molecular weight of 3,000, and an amine value of 984 mg KOH/g) (the amount of the polyallylamine is 1 part) was used and Polyester PE-13 was used instead of Polyester PE-10, A polyallylamine derivative was obtained in a similar manner to Example 3 except the aforementioned matters.

Example 12

As in Example 3, except Polyester PE-14 was used instead of Polyester PE-10. A polyallylamine derivative was obtained in a similar manner to Example 3 except the aforementioned matter.

Example 13

As in Example 7, except Polyester PE-20 was used instead of Polyester PE-11. A polyallylamine derivative was obtained in a similar manner to Example 7 except the aforementioned matter.

Example 14

As in Example 7, except Polyester PE-30 was used instead of Polyester PE-11. A polyallylamine derivative was obtained in a similar manner to Example 7 except the aforementioned matter.

Example 15

As in Example 2, except Polyester PE-40 was used instead of Polyester PE-10. A polyallylamine derivative was obtained in a similar manner to Example 2 except the aforementioned matter.

Example 16

As in Example 15, except the amount of Polyester PE-40 was changed from 10 parts to 25 parts. A polyallylamine derivative was obtained in a similar manner to Example 15 except the aforementioned matter.

Example 17

As in Example 15, except Polyester PE-41 was used instead of Polyester PE-40. A polyallylamine derivative was obtained in a similar manner to Example 15 except the aforementioned matter.

Example 18

As in Example 17, except the amount of Polyester PE-41 was changed from 10 parts to 20 parts. A polyallylamine derivative was obtained in a similar manner to Example 17 except the aforementioned matter.

Example 19

As in Example 2, except Polyester PE-50 was used instead of Polyester PE-10. A polyallylamine derivative was obtained in a similar manner to Example 2 except the aforementioned matter.

Example 20

As in Example 19, except the amount of Polyester PE-50 was changed from 10 parts to 15 parts. A polyallylamine derivative was obtained in a similar manner to Example 19 except the aforementioned matter.

Example 21

As in Example 1, except the amount of Polyester PE-10 was changed from 7 parts to 5 parts. A polyallylamine derivative was obtained in a similar manner to Example 1 except the aforementioned matter.

Example 22

As in Example 2, except Polyester PE-13 was used instead of Polyester PE-10. A polyallylamine derivative was obtained in a similar manner to Example 2 except the aforementioned matter.

Example 23

As in Example 2, except Polyester PE-14 was used instead of Polyester PE-10. A polyallylamine derivative was obtained in a similar manner to Example 2 except the aforementioned matter.

Example 24

As in Example 23, except the amount of Polyester PE-14 was changed from 10 parts to 20 parts. A polyallylamine derivative was obtained in a similar manner to Example 23 except the aforementioned matter.

Example 25

As in Example 14, except the amount of Polyester PE-30 was changed from 10 parts to 5 parts. A polyallylamine derivative was obtained in a similar manner to Example 14 except the aforementioned matter,

Comparative Example 1

As in Example 1, except Polyester PE-00 was used instead of Polyester PE-10. A polyallylamine derivative was obtained in a similar manner to Example 1 except the aforementioned matter.

Comparative Example 2

As in Example 7, except Polyester PE-00 was used instead of Polyester PE-11. A polyallylamine derivative was obtained in a similar manner to Example 7 except the aforementioned matter.

Comparative Example 3

As in Example 3, except Polyester PE-00 was used instead of Polyester PE-10. A polyallylamine derivative was obtained in a similar manner to Example 3 except the aforementioned matter.

Measurement of Amine Value of Polyallylamine Derivative

The amine value was measured by titrating a solution prepared by dissolving 1 g of the polyallylamine derivative in 40 mL of an isoparaffin/xylene (mixture of ortho, meta, and para forms)/ethanol mixture (3/15/15 in mass ratio) with an aqueous solution of hydrochloric acid (0.5 mol/L) and determining the discoloration point with a Thymol Blue Test Solution.

Measurement of Acid Value of Polyallylamine Derivative

The acid value was measured by titrating a solution prepared by dissolving 1 g of the polyallylamine derivative in 40 mL of an isoparaffin/xylene (a mixture of ortho, meta, and para forms)/ethanol mixture (3/15/15 in mass ratio) with potassium hydroxide-ethanol solution (0.1 mol/L) and determining the discoloration point with a phenolphthalein indicator.

Side Chain Mass/Main Chain Mass

The pure mass of the polyester used as the side chain material was determined to be a side chain mass, while the pure mass of polyallylamine used as the main chain material was determined to be a main chain mass. The ratio of side chain mass/main chain mass was calculated.

Calculation of $N_{R2}/(N_{R1}+N_{R2})100$

The number of moles of $N_{R1}$ of $R^1$ in the polyester represented by Formula (I) and the number of moles of $N_{R2}$ of $R^2$ in the polyester represented by Formula (II) were calculated and then $N_{R2}/(N_{R1}+N_{R2})\times 100$ was determined by calculation.

Calculation of Ratio when $A^1$ in Formula (1) is Group Represented by Formulae (4) and (5)

The average molecular weight MM of the monomers was calculated from the molecular weight and the used mass ratio of the carboxylic acid monomers (hydroxy acid or carboxylic acid) used in the polyester synthesis. The monomer repeat number of the side chain polyester RN (=(PM-18)/(MM-18)) was calculated from the calculated MM and the calculated molecular weight PM of the polyester (=56, 100/Acid value of polyester) previously calculated.

The ratio in which $A^1$ in Formula (1) was the groups represented by Formulae (4) and (5) was calculated from $RN\times N_{R2}/(N_{R1}+N_{R2})$.

Number of Structure Units

The number of structure units was calculated by Polyallylamine molecular weight/57 (allylamine molecular weight).

TABLE 1

| | Polyester | Group represented by Formula (2) to Formula (5) | | Ratio when $A^1$ in Formula (1) is group represented by Formulae (4) and (5) |
| --- | --- | --- | --- | --- |
| | | $R^1$ | $R^2$ | |
| Example 1 | PE-10 | —$(CH_2)_{10}C(C_6H_{13})H$— | —$(CH_2)_{16}CH_3$ | 0.60 |
| Example 2 | PE-10 | —$(CH_2)_{10}C(C_6H_{13})H$— | —$(CH_2)_{16}CH_3$ | 0.60 |
| Example 3 | PE-10 | —$(CH_2)_{10}C(C_6H_{13})H$— | —$(CH_2)_{16}CH_3$ | 0.60 |
| Example 4 | PE-10 | —$(CH_2)_{10}C(C_6H_{13})H$— | —$(CH_2)_{16}CH_3$ | 0.60 |
| Example 5 | PE-10 | —$(CH_2)_{10}C(C_6H_{13})H$— | —$(CH_2)_{16}CH_3$ | 0.60 |
| Example 6 | PE-10 | —$(CH_2)_{10}C(C_6H_{13})H$— | —$(CH_2)_{16}CH_3$ | 0.60 |
| Example 7 | PE-11 | —$(CH_2)_{10}C(C_6H_{13})H$— | —$(CH_2)_{16}CH_3$ | 0.32 |
| Example 8 | PE-11 | —$(CH_2)_{10}C(C_6H_{13})H$— | —$(CH_2)_{16}CH_3$ | 0.32 |
| Example 9 | PE-12 | —$(CH_2)_{10}C(C_6H_{13})H$— | —$(CH_2)_{16}CH_3$ | 1.0 |
| Example 10 | PE-12 | —$(CH_2)_{10}C(C_6H_{13})H$— | —$(CH_2)_{16}CH_3$ | 1.0 |
| Example 11 | PE-13 | —$(CH_2)_{10}C(C_6H_{13})H$— | —$(CH_2)_{16}CH_3$ | 0.46 |
| Example 12 | PE-14 | —$(CH_2)_{10}C(C_6H_{13})H$— | —$(CH_2)_{16}CH_3$ | 0.93 |
| Example 13 | PE-20 | —$(CH_2)_{10}C(C_6H_{13})H$— | —$(CH_2)_6(CH_2CH=CH)_2(CH_2)_4CH_3$ | 0.55 |
| Example 14 | PE-30 | —$(CH_2)_{10}C(C_6H_{13})H$— | —$(CH_2)_{14}CH_3$ | 0.65 |

TABLE 1-continued

|  | Polyester | Group represented by Formula (2) to Formula (5) R$^1$ | R$^2$ | Ratio when A$^1$ in Formula (1) is group represented by Formulae (4) and (5) |
|---|---|---|---|---|
| Example 15 | PE-40 | —(CH$_2$)$_{10}$C(C$_6$H$_{13}$)H— | —(CH$_2$)$_{10}$CH$_3$ | 0.75 |
| Example 16 | PE-40 | —(CH$_2$)$_{10}$C(C$_6$H$_{13}$)H— | —(CH$_2$)$_{10}$CH$_3$ | 0.75 |
| Example 17 | PE-41 | —(CH$_2$)$_{10}$C(C$_6$H$_{13}$)H— | —(CH$_2$)$_{10}$CH$_3$ | 1.0 |
| Example 18 | PE-41 | —(CH$_2$)$_{10}$C(C$_6$H$_{13}$)H— | —(CH$_2$)$_{10}$CH$_3$ | 1.0 |
| Example 19 | PE-50 | —(CH$_2$)$_{10}$C(C$_6$H$_{13}$)H— | —(CH$_2$)$_{16}$CH$_3$/—(CH$_2$)$_{10}$CH$_3$ | 0.68 |
| Example 20 | PE-50 | —(CH$_2$)$_{10}$C(C$_6$H$_{13}$)H— | —(CH$_2$)$_{16}$CH$_3$/—(CH$_2$)$_{10}$CH$_3$ | 0.68 |
| Example 21 | PE-10 | —(CH$_2$)$_{10}$C(C$_6$H$_{13}$)H— | —(CH$_2$)$_{16}$CH$_3$ | 0.60 |
| Example 22 | PE-13 | —(CH$_2$)$_{10}$C(C$_6$H$_{13}$)H— | —(CH$_2$)$_{16}$CH$_3$ | 1.0 |
| Example 23 | PE-14 | —(CH$_2$)$_{10}$C(C$_6$H$_{13}$)H— | —(CH$_2$)$_{16}$CH$_3$ | 0.14 |
| Example 24 | PE-14 | —(CH$_2$)$_{10}$C(C$_6$H$_{13}$)H— | —(CH$_2$)$_{16}$CH$_3$ | 0.14 |
| Example 25 | PE-30 | —(CH$_2$)$_{10}$C(C$_6$H$_{13}$)H— | —(CH$_2$)$_{14}$CH$_3$ | 0.59 |
| Comparative Example 1 | PE-00 | —(CH$_2$)$_{10}$C(C$_6$H$_{13}$)H— | — | 0.00 |
| Comparative Example 2 | PE-00 | —(CH$_2$)$_{10}$C(C$_6$H$_{13}$)H— | — | 0.00 |
| Comparative Example 3 | PE-00 | —(CH$_2$)$_{10}$C(C$_6$H$_{13}$)H— | — | 0.00 |

TABLE 2

|  | $N_{R2}/(N_{R1} + N_{R2}) \times 100$ | Polyallylamine | Number of structure units | Side chain mass/ main chain mass | Amin value | Acid value |
|---|---|---|---|---|---|---|
| Example 1 | 10.5 | PAA-08 | 140 | 7 | 99 | 6 |
| Example 2 | 10.5 | PAA-08 | 140 | 10 | 62 | 4 |
| Example 3 | 10.5 | PAA-08 | 140 | 15 | 33 | 3 |
| Example 4 | 10.5 | PAA-08 | 140 | 20 | 18 | 4 |
| Example 5 | 10.5 | PAA-01 | 28 | 10 | 62 | 4 |
| Example 6 | 10.5 | PAA-15C | 263 | 20 | 18 | 4 |
| Example 7 | 5.3 | PAA-03 | 53 | 10 | 64 | 4 |
| Example 8 | 5.3 | PAA-03 | 53 | 20 | 21 | 5 |
| Example 9 | 20.9 | PAA-08 | 140 | 7 | 94 | 5 |
| Example 10 | 20.9 | PAA-08 | 140 | 10 | 58 | 3 |
| Example 11 | 10.5 | PAA-03 | 53 | 15 | 22 | 3 |
| Example 12 | 26.0 | PAA-08 | 140 | 15 | 12 | 3 |
| Example 13 | 10.6 | PAA-03 | 53 | 10 | 58 | 4 |
| Example 14 | 11.5 | PAA-03 | 53 | 10 | 61 | 4 |
| Example 15 | 14.3 | PAA-08 | 140 | 10 | 57 | 3 |
| Example 16 | 14.3 | PAA-08 | 140 | 25 | 7 | 7 |
| Example 17 | 20.9 | PAA-08 | 140 | 10 | 56 | 3 |
| Example 18 | 20.9 | PAA-08 | 140 | 20 | 14 | 5 |
| Example 19 | 12.4 | PAA-08 | 140 | 10 | 60 | 3 |
| Example 20 | 12.4 | PAA-08 | 140 | 15 | 30 | 3 |
| Example 21 | 10.5 | PAA-08 | 140 | 5 | 136 | 1 |
| Example 22 | 31.2 | PAA-08 | 140 | 10 | 38 | 4 |
| Example 23 | 2.2 | PAA-08 | 140 | 10 | 63 | 3 |
| Example 24 | 2.2 | PAA-08 | 140 | 20 | 20 | 3 |
| Example 25 | 10.5 | PAA-03 | 53 | 5 | 137 | 2 |
| Comparative Example 1 | 0 | PAA-08 | 140 | 7 | 100 | 4 |
| Comparative Example 2 | 0 | PAA-03 | 53 | 10 | 65 | 3 |
| Comparative Example 3 | 0 | PAA-08 | 140 | 15 | 35 | 3 |

Preparation of Liquid Developer
Synthesis of Acid Group-Containing Resin

Radical polymerization was carried out in a toluene solvent at 80° C. under a nitrogen atmosphere using styrene/stearyl methacrylate/acrylic acid=75/5/20 (molar ratio) as monomers and azobisisobutyronitrile as a radical initiator to synthesize an acid group-containing resin having a weight average molecular weight of 51,600 and an acid value of 94 mg KOH/g.

A mixture was prepared by mixing 15.0 parts of carbon black MA100 (manufactured by Mitsubishi Chemical Corporation), 5.0 parts of a pigment dispersant (Ajisper PB821, manufactured by Ajinomoto Fine-Techno Co., Inc.), and 80.0 parts of THF and the mixture was kneaded by a paint shaker using glass beads having a diameter of 1 mm for 180 minutes.

To 20.0 parts of this kneaded product, 20.0 parts of a binder resin (Vylon 220, manufactured by Toyobo Co., Ltd., molecular weight Mn 3,000, Tg 53° C., hydroxy value 50 mg KOH/g, acid value less than 2 mg KOH/g), 4.0 parts of the acid group-containing resin synthesized above, and 56 parts of THF were added and the mixture was heated and stirred at 50° C.

Thereafter, 1.0 part of the polyallylamine derivative synthesized in Example 1 as a particle dispersant was added to the mixture and the resultant mixture was stirred, Thereafter, 80 parts of light liquid paraffin (HICOL M-52, manufactured by KANEDA Co., Ltd.) was added to the resultant mixture to give a mixed liquid. The mixed liquid was charged into a closed type homogenizer to which a solvent distilling apparatus was connected (connected to a depressurizing apparatus) and the pressure was reduced by the depressurizing apparatus with stirring in high speed (rotating speed 6,000 rpm) while controlling a mixed liquid temperature between 50° C. and 60° C. THF was distilled off from the solvent distilling apparatus to give a liquid developer including the resin particle dispersion liquid. Similarly, liquid developers were obtained using the various polyamine derivatives previously synthesized in Examples 2 to 25 and Comparative Examples 1 to 3.

Performance Evaluation of Liquid Developer

Average Particle Diameter

By using a digital microscope VHX-500F (manufactured by Keyence Corporation), 20 particles contained in the liquid developer were visually and randomly selected and the particle diameters (particle diameters of the binder resin and the acid group-containing resin) of the selected particles were measured.

Electrophoretic Property

The liquid developer was poured into an electrophoresis cell having a distance between electrodes of 8 cm, A voltage of 200 V was applied and the resin particles in the liquid developer were observed. The electrophoretic property was evaluated in accordance with the following criteria.

○: Particles smoothly migrate without aggregation.

x: Particles aggregate between electrodes and do not migrate.

TABLE 3

| | Particle diameter (μm) | Electrophoretic property |
| --- | --- | --- |
| Example 1 | 2-3 | ○ |
| Example 2 | 1-2 | ○ |
| Example 3 | 2-3 | ○ |
| Example 4 | 1-2 | ○ |
| Example 5 | 1-2 | ○ |
| Example 6 | 2-3 | ○ |
| Example 7 | 2-3 | ○ |
| Example 8 | 2-3 | ○ |
| Example 9 | 2-3 | ○ |
| Example 10 | 1-2 | ○ |
| Example 11 | 1-2 | ○ |
| Example 12 | 3-4 | ○ |
| Example 13 | 1-2 | ○ |
| Example 14 | 1-2 | ○ |
| Example 15 | 1-2 | ○ |
| Example 16 | 3-4 | ○ |
| Example 17 | 2-3 | ○ |
| Example 18 | 2-3 | ○ |
| Example 19 | 1-2 | ○ |
| Example 20 | 1-2 | ○ |
| Example 21 | 5-10 | ○ |
| Example 22 | 5-7 | ○ |
| Example 23 | 5-8 | ○ |
| Example 24 | 5-8 | ○ |
| Example 25 | 5-10 | ○ |
| Comparative Example 1 | 10< Aggregation | X |
| Comparative Example 2 | 10< Aggregation | X |
| Comparative Example 3 | 10< Aggregation | X |

In Table 3, "10<Aggregation" means a state in which the particle diameter exceeds 10 μm or the particles aggregate.

Preparation and Performance Evaluation of Particle-Containing Composition

Particle-Containing Composition 1

A mixture was prepared by mixing 15.0 parts of electrically conductive carbon black (manufactured by Mitsubishi Chemical Corporation, 3230B) as particles, 5.0 parts of the polyallylamine derivative synthesized in Example 2 as a particle dispersant, and 80.0 parts of light liquid paraffin (Highcol M-52, manufactured by KANEDA Co., Ltd.) and the mixture was kneaded by a paint shaker using glass beads having a diameter of 1 mm for 180 minutes to prepare Particle-containing composition 1. The average dispersed particle diameter and viscosity at 25° C. of Particle-containing composition 1 were measured.

Particle-Containing Composition 2

The polyallylamine derivative synthesized in Example 2 was replaced with the polyamine derivative previously synthesized in Comparative Example 2. Particle-containing composition 2 was prepared in a similar manner to the preparation of Particle-containing composition 1 except the aforementioned matter and the average dispersed particle diameter and the viscosity at 25° C. of Particle-containing composition 2 were measured.

Particle-Containing Composition 3

The conductive carbon black (manufactured by Mitsubishi Chemical Corporation, 3230B) was replaced with a phthalocyanine-based pigment (Irgalite Blue GLVO, manufactured by BASF SE). Particle-containing composition 3 was prepared in a similar manner to the preparation of Particle-containing composition 1 except the aforementioned matter and the average dispersed particle diameter and the viscosity at 25° C. of Particle-containing composition 3 were measured.

Particle-Containing Composition 4

The polyallylamine derivative synthesized in Example 2 was replaced with the polyamine derivative synthesized in Comparative Example 2. Particle-containing composition 4 was prepared in a similar manner to the preparation of Particle-containing composition 3 except the aforementioned matter and the average dispersed particle diameter and the viscosity at 25° C. of Particle-containing composition 4 were measured.

Measurement of Viscosity

The viscosity of the particle-containing composition was measured at 25° C. using a vibration type viscometer (VISCOMATE VM-10A, manufactured by CBC Co., Ltd.), and the viscosity immediately after particle dispersion and after 4 weeks at 25° C. were compared to calculate the viscosity increase ratio (Viscosity after 4 weeks/Viscosity immediately after dispersion).

Measurement of Average Dispersed Particle Diameter

The particle-containing composition obtained above was diluted to a 1,000-fold with light liquid paraffin (HICOL M-52, manufactured by KANEDA Co., Ltd.), and the average dispersed particle diameter was measured by a dynamic light scattering method using Zetasizer Nano ZSP (manufactured by Malvern Instruments Ltd.).

TABLE 4

| | Conductive carbon black #3230B | | | |
| --- | --- | --- | --- | --- |
| | Viscosity (mPa · s) | | | Initial average particle diameter (nm) |
| | Initial viscosity | Viscosity after 4 weeks at 25° C. | Viscosity increase ratio | |
| Particle-containing composition 1 | 19 | 21 | 1.1 | 285 |
| Particle-containing composition 2 | 23 | 55 | 2.4 | 320 |

TABLE 5

| | Irgalite Blue GLVO | | | |
| --- | --- | --- | --- | --- |
| | Viscosity (mPa · s) | | | Initial average particle diameter (nm) |
| | Initial viscosity | Viscosity after 4 weeks at 25° C. | Viscosity increase ratio | |
| Particle-containing composition 3 | 23 | 23 | 1.0 | 63 |
| Particle-containing composition 4 | 27 | 55 | 2.0 | 95 |

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A polyallylamine derivative, comprising 10 to 450 structural units represented by Formula (1):

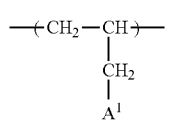

(1)

wherein in Formula (1), $A^1$ represents a group represented by Formula (2), Formula (3), Formula (4), or Formula (5), and a plurality of said $A^1$s are optionally the same as or different from each other; with the proviso that at least one of said $A^1$s is a group represented by Formula (4) or Formula (5):

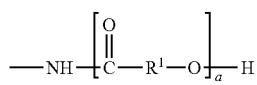

(2)

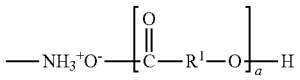

(3)

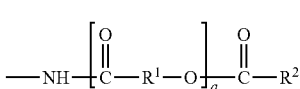

(4)

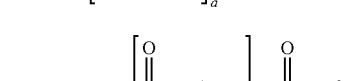

(5)

wherein in Formulae (2) and (3), $R^1$ represents an alkylene group optionally having a substituent, an alkenylene group optionally having a substituent, or an alkylene group having an ether bond optionally having a substituent; a represents an integer of 0 to 100; a plurality of said $R^1$s are the same as or different from each other;

in Formulae (4) and (5), $R^1$ represents an alkylene group optionally having a substituent, an alkenylene group optionally having a substituent, or alkylene group having an ether bond optionally having a substituent; $R^2$ represents an alkyl group optionally having a substituent, an alkenyl group optionally having a substituent, or an alkyl group having an ether bond optionally having a substituent; a represents an integer of 0 to 100; and a plurality of said $R^1$s are the same as or different from each other, wherein $N_{R2}/(N_{R1}+N_{R2})\times100$ is 1 to 35 where $N_{R1}$ is an average number of moles of $R^1$ present in the molecules of the polyallylamine derivative and $N_{R2}$ is an average number of moles of $R^2$ present in the molecules of the polyallylamine derivative.

2. The polyallylamine derivative according to claim 1, wherein the polyallylamine derivative has a side chain mass/main chain mass ratio of 6 to 28.

3. The polyallylamine derivative according to claim 1, which has an amine value of 5 mg KOH/g to 150 mg KOH/g.

4. The polyallylamine derivative according claim 1, wherein $R^1$ comprises a branched alkylene group having 6 to 30 carbon atoms optionally having a substituent.

5. The polyallylamine derivative according to claim 1, wherein $R^2$ comprises an alkyl group having 10 to 20 carbon atoms optionally having a substituent or an alkenyl group having 2 to 30 carbon atoms optionally having a substituent.

6. The polyallylamine derivative according to claim 1, which has an acid value of 1 mg KOH/g to 10 mg KOH/g.

7. A dispersant, comprising a polyallylamine derivative according to claim 1.

8. Treated particles treated with a dispersant according to claim 7.

9. A particle-containing composition, comprising a polyallylamine derivative according to claim 1 and particles.

10. A paint, comprising a particle-containing composition according to claim 9.

11. An ink composition, comprising a particle-containing composition according to claim 9.

12. A liquid developer, comprising a particle-containing composition according to claim 9.

13. An anti-blocking agent, comprising a particle-containing composition according to claim 9.

* * * * *